A. B. HAZARD.
APPARATUS FOR MEASURING ELECTRICAL RESISTANCE.
APPLICATION FILED NOV. 23, 1917.
1,324,818.
Patented Dec. 16, 1919.
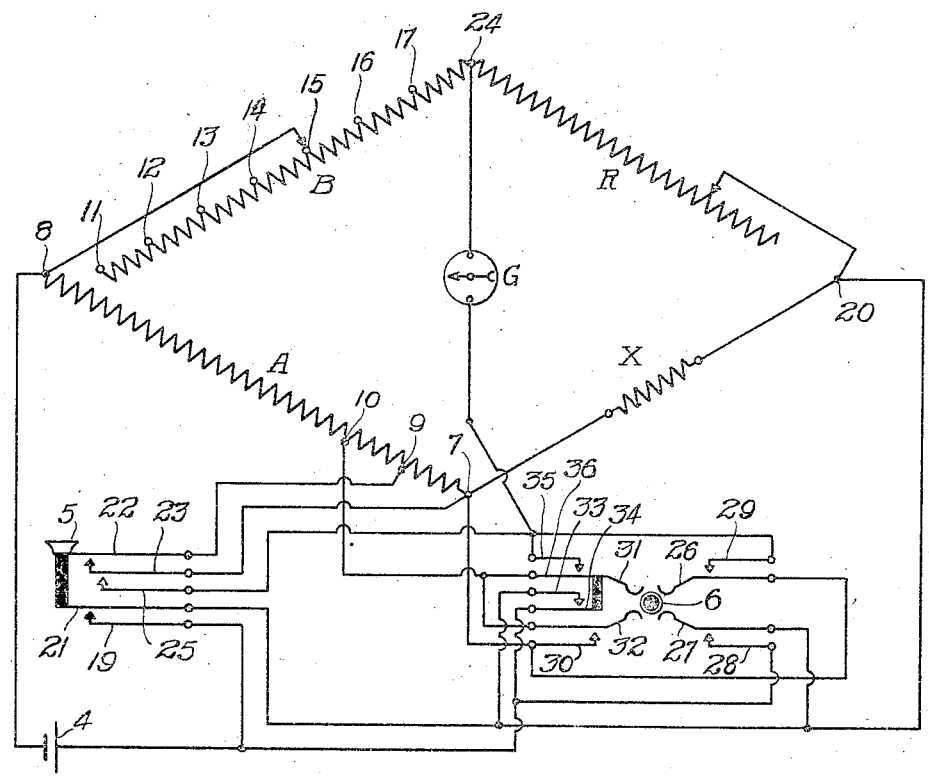
Inventor
Allen B. Hazard
by J.G. Roberts
Atty.

UNITED STATES PATENT OFFICE.

ALLEN B. HAZARD, OF BERWYN, ILLINOIS, ASSIGNOR TO WESTERN ELECTRIC COMPANY, INCORPORATED, OF NEW YORK, N. Y., A CORPORATION OF NEW YORK.

APPARATUS FOR MEASURING ELECTRICAL RESISTANCE.

1,324,818.     Specification of Letters Patent.     Patented Dec. 16, 1919.

Application filed November 23, 1917. Serial No. 203,596.

*To all whom it may concern:*

Be it known that I, ALLEN B. HAZARD, a citizen of the United States, residing at Berwyn, in the county of Cook and State of Illinois, have invented certain new and useful Improvements in Apparatus for Measuring Electrical Resistance, of which the following is a full, clear, concise, and exact description.

This invention relates to apparatus for measuring electrical resistance, and more particularly to a Wheatstone bridge circuit arranged to indicate whether or not a test specimen has a resistance which lies within certain specified maximum and minimum resistance values.

The invention is characterized by an improved bridge circuit which increases the speed and efficiency for determining whether the test specimen lies between certain maximum and minimum resistance limits and also for determining the exact resistance of the test piece.

Manufacturing limits on electrical coils used in commercial apparatus are usually given in maximum and minimum resistance values which are calculated in allowable percentage variations of the total resistance of the test specimen, and for certain types of apparatus these permissible percentage variations are standard. Thus for most telephone apparatus the resistance of the test specimen is permitted to vary 5% above and below the exact resistance specified.

It is the object of this invention to produce a bridge circuit provided with means within the bridge wiring to determine whether or not a test specimen comes within certain specified maximum and minimum resistance values, irrespective of the resistance of the test specimen and with one setting of the bridge.

Another object resides in producing a bridge circuit provided with means for measuring either the exact resistance of the test piece or for determining whether it lies between certain maximum and minimum resistance limits by means of a single setting of the rheostat arm of the bridge.

Other features of the invention will become apparent from the following description and the appended claims.

The invention is illustrated in the accompanying circuit diagram which depicts in theoretical form the circuit connections of the improved bridge circuit. In this diagram A and B represent respectively the fixed and variable ratio arms, R the rheostat arm, and X the unknown resistance arm of the bridge. G indicates the galvanometer used in balancing the bridge circuit. The bridge is provided with the battery 4, the keys 5 and 6, and suitable circuit connections which interconnect these keys and battery with the four arms of the bridge and galvanometer. The fixed ratio arm A of the bridge is connected to the arm X at 7, to the arm B at 8, and has taps leading therefrom at 9 and 10. When the bridge circuit is used to obtain exact resistance readings the portion of the fixed ratio arm A included between 8 and 9 is used; and when the circuit is used for determining maximum and minimum resistance values, the portions of this bridge arm between 8 and 7 and 8 and 10 are used respectively. The variable ratio arm B is provided with a series of taps 11, 12, 13, 14, 15, 16, and 17 which are utilized in obtaining the bridge ratio, which ratio is set in a well known manner for the purpose of obtaining the best and most efficient operation of the bridge.

In the ordinary operation of the bridge when the various resistance arms are balanced, the resistance values in these arms may be equated as $$\frac{A}{B}=\frac{X}{R},$$

or in other words, $$X=R\left(\frac{A}{B}\right).$$

In the bridge circuit shown in the diagram the value A of the above equation comprises the resistance shown between the points 8 and 9. When resistances are to be measured for a maximum and minimum variation of 5% of the total value of the resistance that is measured the fixed ratio arm A is tapped at 10, the resistance included between the points 9 and 10 being 5% of the total resistance of the arm A included between 8 and 9. An equal amount of resistance is tapped onto the point 9 between the points 9 and 7. Consequently when the bridge circuit is used with the connection from the point 10 on the fixed ratio arm A, A represents 95% of the total resistance of the ratio arm between the points 8 and 9, and the bridge will be balanced when $$.95X = R\left(\frac{.95A}{B}\right).$$

Likewise when the point 7 is used as one end of the ratio arm A, the bridge will be balanced when $$1.05X = R\left(\frac{1.05A}{B}\right).$$

Consequently if the unknown resistance is first measured with the fixed ratio arm including the resistance between 8 and 7, the bridge will be balanced if X equals the maximum specified resistance of the coil; and if the unknown resistance be measured with the portion of the fixed ratio arm A contained between the points 8 and 10, the bridge will be balanced if X is equal to the minimum specified resistance, the maximum and minimum specified variation in each of these cases being 5% of the total resistance of the coil X. Also if the coil X is neither at a minimum nor maximum resistance, but lies somewhere between these limits, the galvanometer G will be first deflected to the left and then to the right, thereby denoting an unbalance of the bridge, but also denoting that the coil is within the specified limits. If the galvanometer is deflected twice in the same direction it will denote that the coil does not come within the specified resistance limits, being of either too high or too low resistance. Obviously any desired percentage variation from the specified resistance of the coil may be taken care of for the purpose of maximum and minimum readings by taking suitable resistance percentage taps of the fixed rheostat arm A on either side of the point 9.

In the operation of the circuit when it is desired to measure the exact resistance of the unknown specimen X the key 5 is utilized. When this key is depressed that portion of the resistance contained between 9 and 7 in the fixed rheostat arm A is short-circuited. The circuit of the bridge under these circumstances may be traced as follows: from battery 4 to point 8 at which the circuit divides, one branch leading through the variable ratio arm B which has been previously set for the desired ratio, through the rheostat arm which has been set for a balance, to the point 20 and thence through the springs 21 and 19 of key 5 back to battery. The other branch of the circuit from the point 8 leads through the fixed ratio arm A to the point 9, thence through springs 22 and 23 of key 5 to point 7, thereby short-circuiting the resistance between 9 and 7, and thence through the unknown resistance X to point 20 and back to battery as previously described. In this measurement the galvanometer circuit G may be traced from point 24, the junction of the variable ratio arm and the rheostat arm, through the galvanometer to the spring 25 of the key 5, back to point 7, the junction of the fixed ratio arm and the unknown resistance arm X.

When it is desired to determine whether the resistance X lies between certain maximum and minimum resistance values the key 6 is used. To determine whether the resistance X has a value below the prescribed maximum specified resistance, the key 6 is moved to the right, thereby spreading the springs 26 and 27. Under these conditions the circuit may be traced from battery 4 to point 8 where it divides, one branch leading through the adjustable ratio arm B and the rheostat arm R to the point 20, and the other branch leading through the fixed ratio arm from the point 8 to the point 7 and thence through the unknown resistance X to point 20, from where the circuit may be traced through key springs 27 and 28 and thence back to battery 4. The galvanometer circuit in this case may be traced from point 24, through the galvanometer, through springs 29, 26, and 30 of key 6 and thence back to the junction point 7.

If the value of the resistance X lies below the maximum specified, the galvanometer will be deflected to the right, current flowing in a circuit which may be traced as follows: from battery 4 to point 8, through the variable ratio arm B to point 24, through the galvanometer G, the key springs 29, 26, and 30 to point 7, through the resistance X to point 20 and thence through the key springs 27 and 28 back to battery 4. If the value of the resistance X is above the maximum resistance specified, the unbalance of the bridge will be such that current will flow from battery 4 to point 8, through the ratio arm A to point 7, thence to key spring 30, through the key springs 26 and 29 and the galvanometer G to point 24, and thence by way of the rheostat arm R to point 20 and the key springs 27 and 28 back to battery. This will deflect the galvanometer to the left.

It will therefore be evident that when the key 6 is actuated toward the right, the galvanometer G will be deflected toward the right if the resistance value of the unknown resistance X falls within the maximum value specified, and to the left if the value of the resistance is higher than the specified maximum.

To determine whether the value of the unknown resistance is such as to fall within the specified minimum resistance, the key 6 is operated to the left, thereby spreading springs 31 and 32. Under these circumstances that part of the resistance of the fixed rheostat arm A contained between the points 10 and 7 is short-circuited, and the bridge circuit connections may be traced as follows: from battery 4 to point 8 at which the circuit divides, one branch leading through the variable ratio arm B and the rheostat arm R to the point 20. The other branch of this circuit includes the fixed ratio arm resistance between the points 8 and 10, from where the circuit may be traced through key springs 32 and 30 to point 7, thereby short-circuiting the resistance contained between the points 10 and 7, and thence through the unknown resistance X to point 20, at which the divided circuit unites, and may be traced through key springs 33 and 34 back to battery. The galvanometer circuit in this case may be traced from point 24 through the galvanometer and then to point 10 by way of key springs 35 and 36.

If the resistance X under test comes within the specified minimum, current will flow through the above circuit as follows: from battery 4 to point 8, through the fixed ratio arm A to point 10, through key contacts 36 and 35 and the galvanometer G to point 24 and then by way of rheostat arm R through point 20 and key contacts 33 and 34 back to battery. This will deflect the galvanometer G to the left, thereby indicating that the value of the unknown resistance falls within the prescribed minimum specified. If the value of the resistance X is greater than this prescribed minimum, then current will flow through the bridge circuit from battery 4 to point 8, through the variable ratio arm B to point 24, thence through the galvanometer G, the key contacts 35, 36, 32, and 30 to point 7, through the unknown resistance X to point 20, thence through the key contacts 33 and 34 back to battery 4. Current flowing in this circuit will deflect the galvanometer to the right, thereby showing that the resistance is less than the prescribed minimum.

From the foregoing description it will be evident that when an unknown resistance is placed in the unknown resistance arm X and the key 6 actuated first to the right and then to the left, the galvanometer G will be deflected first to the right and then to the left if the value of the unknown resistance is such as to fall within the prescribed resistance limits. If the value of the resistance is too high, the galvanometer will be deflected to the left for each actuation of the key 6; and if the value of the resistance is too low, the galvanometer will be deflected to the right for each actuation of the key 6.

Obviously in measuring resistances to determine whether they fall within prescribed maximum and minimum resistance limits, it is not necessary to know whether the resistance is too high or too low. Therefore, all that the operator need do in measuring such resistances is to actuate the key 6 first to the right and then to the left and observe the deflections of the galvanometer and to know that the galvanometer will be deflected first in one direction and then in the other direction if the resistance that is being measured lies within the prescribed limits. When the galvanometer is thus deflected it will be positive indication to the operator that the coil or resistance falls within the limits desired. If the galvanometer is deflected in the same direction for both movements of the key, it will be a positive indication that the coil is without either the maximum or the minimum limit and should be rejected.

If it is desired to use the bridge to measure the exact resistance of the coil this can be readily done, as hereinbefore described, by the use of the key 5, the key 6 remaining in its normal condition under these circumstances.

The use of this bridge results in a great economy where a large number of coils of like resistance are to be tested to determine whether they fall within certain prescribed maximum and minimum resistance limits. Thus in the manufacture of such coils a definite resistance is specified, which resistance it is attempted to meet in the coil winding operation. This resistance is given to the testing operator, and after setting the variable ratio arm, depending upon the size of the resistance, and the rheostat arm to the specified resistance, he is in a position to make accurate determinations as to whether the resistance of the coils falls within the specified limits by merely operating the key 6 to the right and the left and observing the galvanometer deflections.

In the setting of the bridge no calculations are required other than the ratio between the resistance which is being measured and the setting of the rheostat arm which determines the setting of the variable rheostat arm. The calculations for maximum and minimum limitations, irrespective of the value of the resistance which is being measured, is automatically taken care of by the bridge connections. The bridge consequently eliminates, very materially, errors due to the personal equation in the setting of bridges for the determination of maximum and minimum values. It also increases substantially the efficiency with which coils may be tested. The use of the bridge is also universal inasmuch as its adaptation for direct maximum and minimum value readings has not destroyed its adaptability for exact measurement readings whereby the bridge may be adapted for resistance measurements of any character whatsoever.

Although the invention has been described for resistance measurements of certain prescribed variation, it is obviously not limited thereto, many changes and applications being included within its scope as set forth in the following claims.

What is claimed is:

1. A bridge circuit comprising in combination, a variable ratio arm, a rheostat arm, a test specimen, a fixed ratio arm, a battery, a current detecting instrument, interconnecting circuits, and means associated with said fixed ratio arm to determine whether the resistance of said test specimen corresponds to a specified value or with one setting of the rheostat arm whether the resistance lies within a designated percentage variation above or below said resistance value.

2. In a resistance measuring apparatus, the combination with a Wheatstone bridge circuit, of a test specimen, resistance connections associated with the fixed ratio arm of said bridge circuit, and means for switching said resistance connections to determine whether the resistance of said specimen equals a specified value or with one setting of the rheostat arm whether the resistance lies within certain percentage variations above and below said value.

3. In a resistance measuring apparatus, the combination with a Wheatstone bridge circuit, of a test specimen, and means associated with one of the ratio arms of said bridge circuit to determine whether the resistance of said specimen lies between certain specified maximum and minimum resistance limits.

4. In a resistance measuring apparatus, the combination with a Wheatstone bridge circuit, of a test specimen, said bridge circuit comprising a fixed ratio arm resistance for measuring the exact resistance of said test specimen, resistance taps connected to both sides of one end of said fixed ratio arm, and means for alternately switching one resistance tap and then the other into the bridge circuit and switching the battery and galvanometer connections to determine whether said specimen lies between prescribed maximum and minimum resistance limits.

5. A bridge circuit comprising a variable ratio arm, a resistance arm, a battery, a current detecting instrument, a test specimen, a fixed ratio arm used in measuring the exact resistance of said specimen, means for adding resistance to said fixed ratio arm to determine whether the specimen falls within a prescribed maximum resistance value, and means for short-circuiting a portion of said fixed ratio arm resistance to determine whether the specimen lies within a prescribed minimum resistance value.

6. In a resistance measuring apparatus, the combination with a bridge circuit comprising a fixed ratio arm for measuring the exact resistance of a test specimen, of means for increasing and decreasing the resistance of said ratio arm to determine whether the resistance of said test specimen lies between maximum and minimum resistance limits.

7. In a resistance measuring apparatus, the combination with a bridge circuit comprising a fixed ratio arm for measuring the exact resistance of a test specimen, of means for increasing and decreasing the resistance of said ratio arm, and means for switching the galvanometer and battery connections of said bridge circuit as the resistance of said fixed ratio arm is increased and decreased for measuring the resistance of said test piece and determining whether the resistance lies between prescribed maximum and minimum resistance limits.

In witness whereof, I hereunto subscribe my name this 19th day of September A. D., 1917.

ALLEN B. HAZARD.